July 23, 1957

R. E. MORTON 2,800,570

CONTOUR WELDING MACHINE

Filed March 31, 1955

INVENTOR.
Robert Earl Morton
BY Barthel + Bugbee
Attys

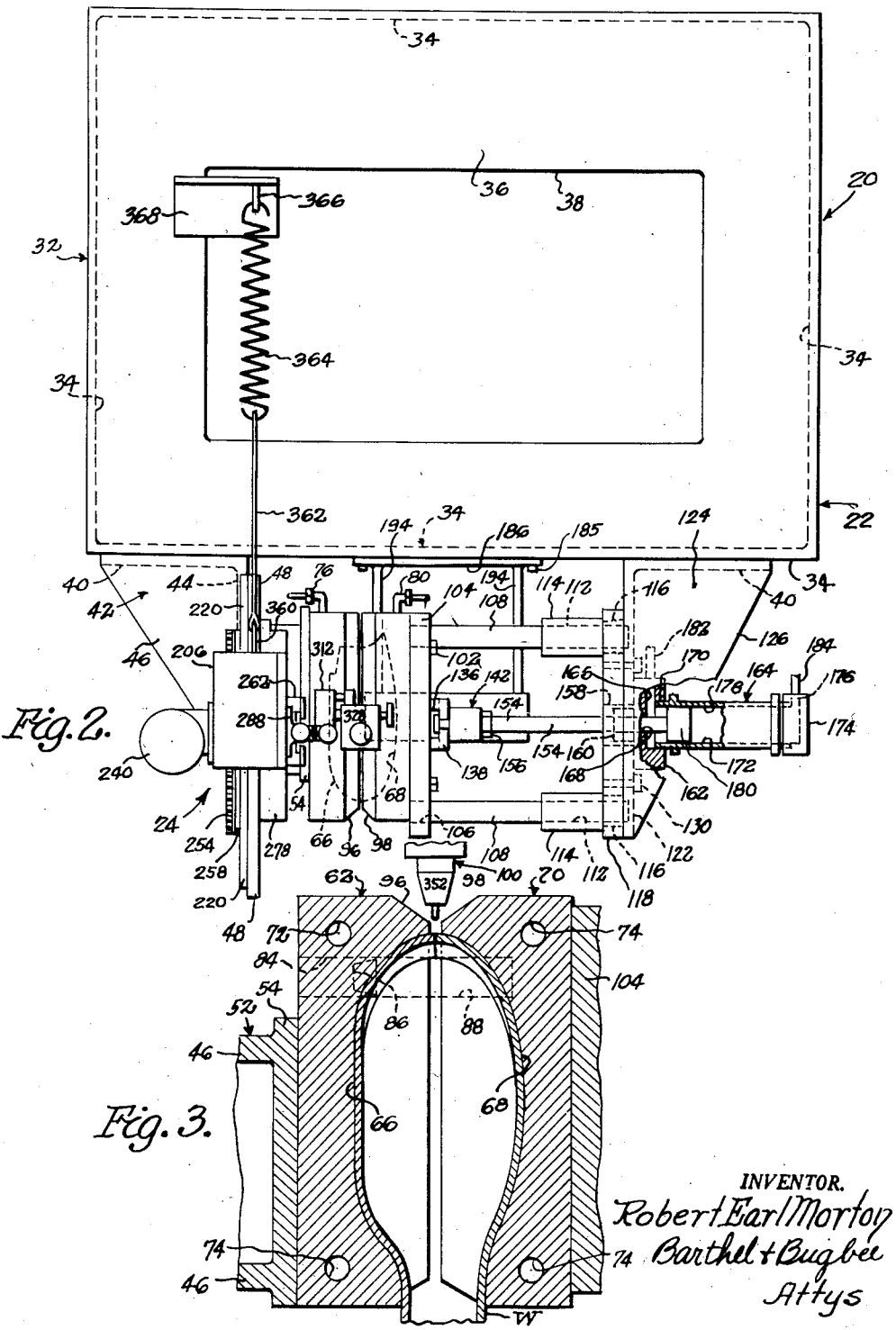

July 23, 1957 R. E. MORTON 2,800,570
CONTOUR WELDING MACHINE
Filed March 31, 1955 7 Sheets-Sheet 3

INVENTOR.
Robert Earl Morton
Barthel & Bugbee
Attys

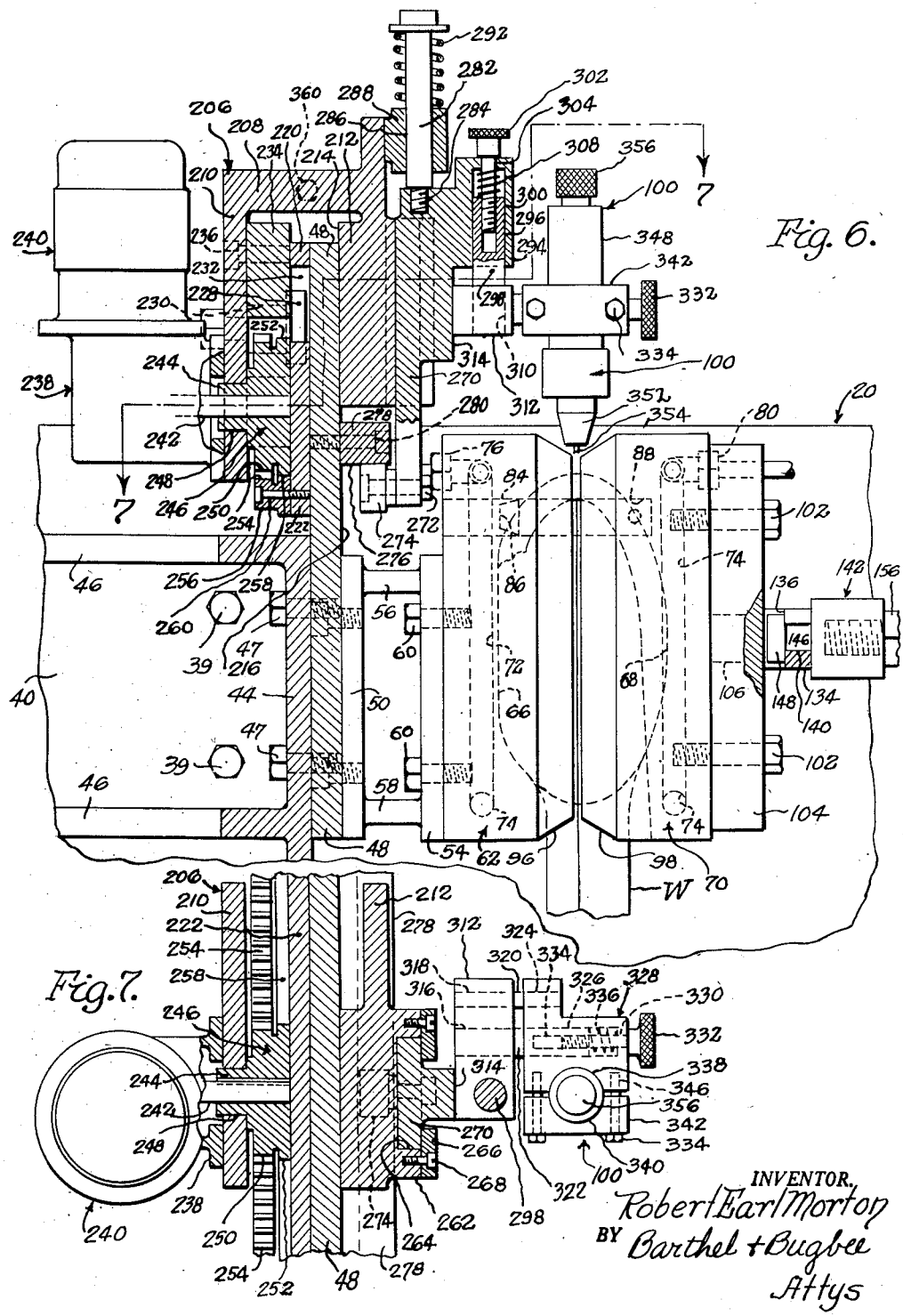

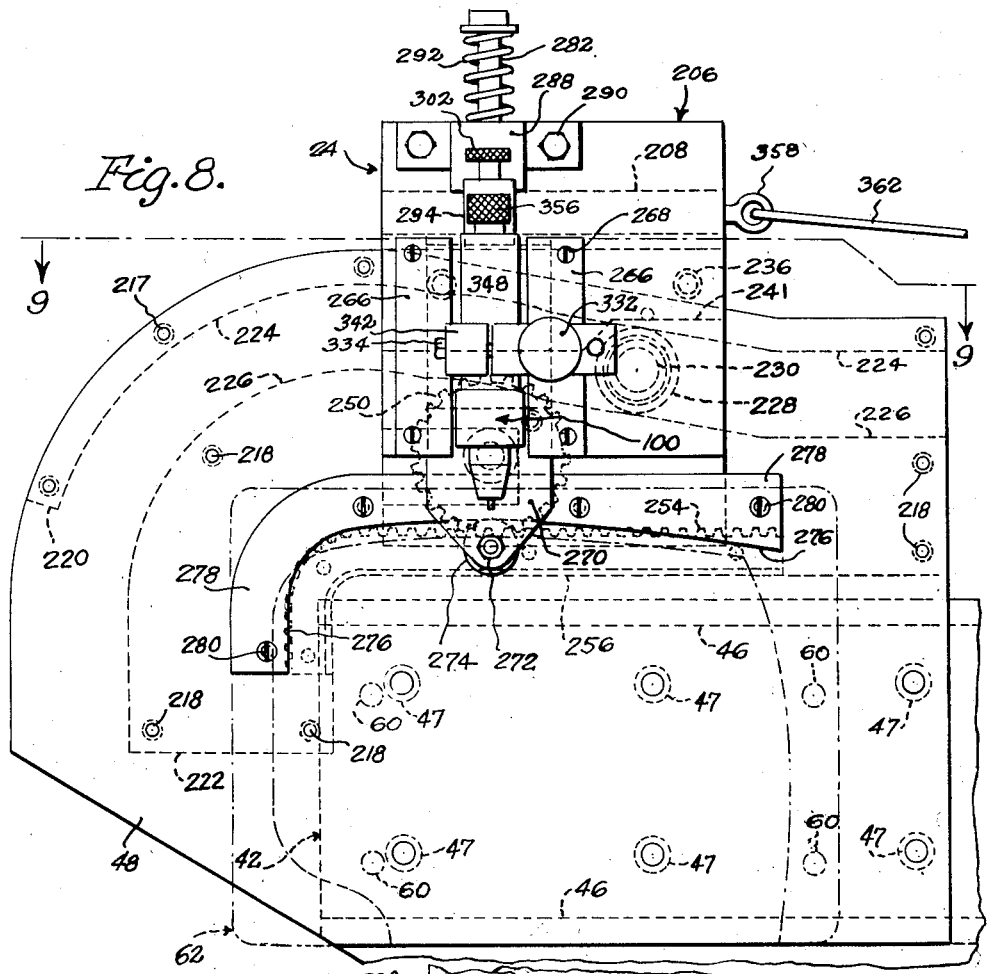

July 23, 1957 R. E. MORTON 2,800,570
CONTOUR WELDING MACHINE
Filed March 31, 1955 7 Sheets-Sheet 6
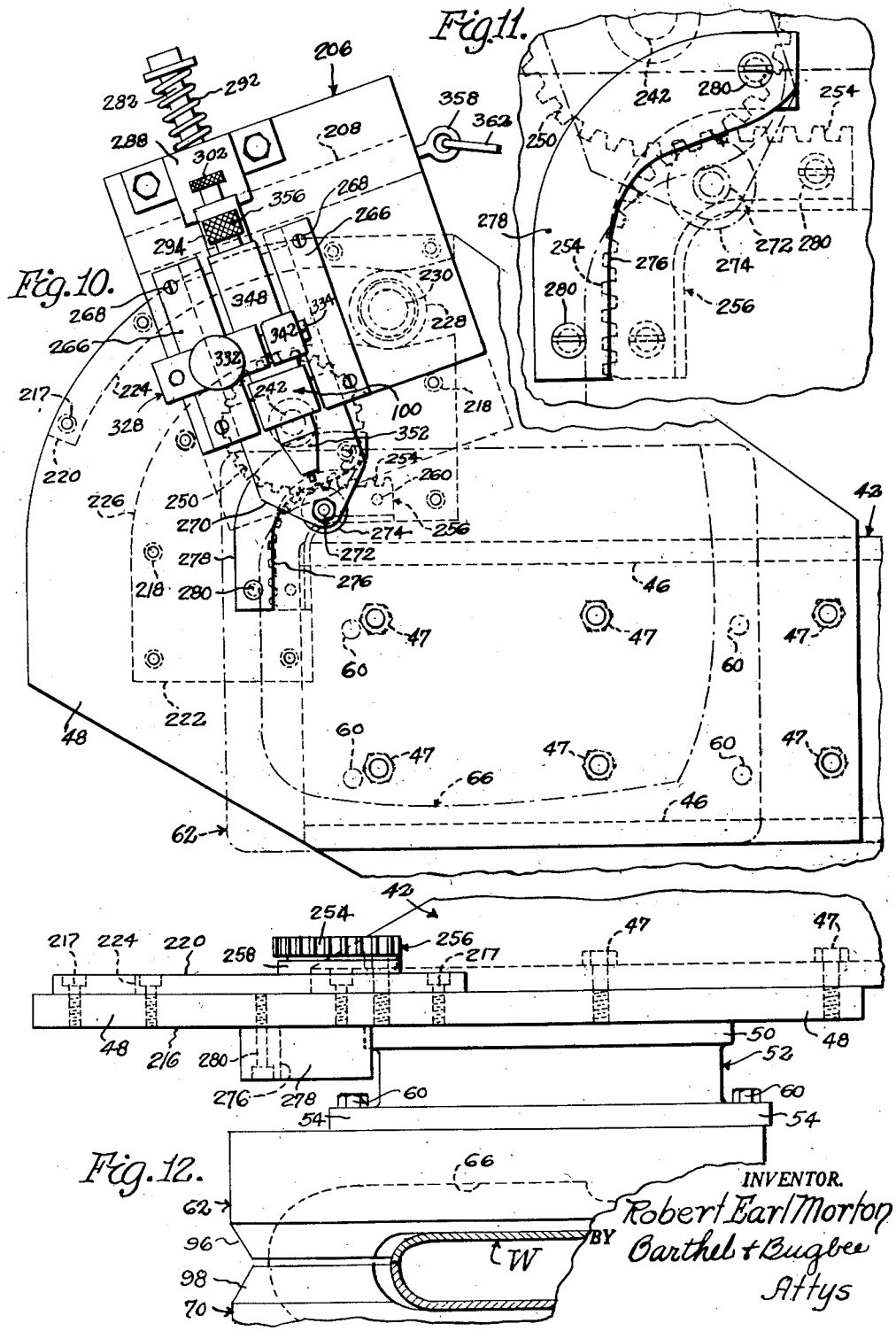
INVENTOR.
Robert Earl Morton
BY Carthel + Bugbee
Attys July 23, 1957 R. E. MORTON 2,800,570
CONTOUR WELDING MACHINE
Filed March 31, 1955 7 Sheets-Sheet 7
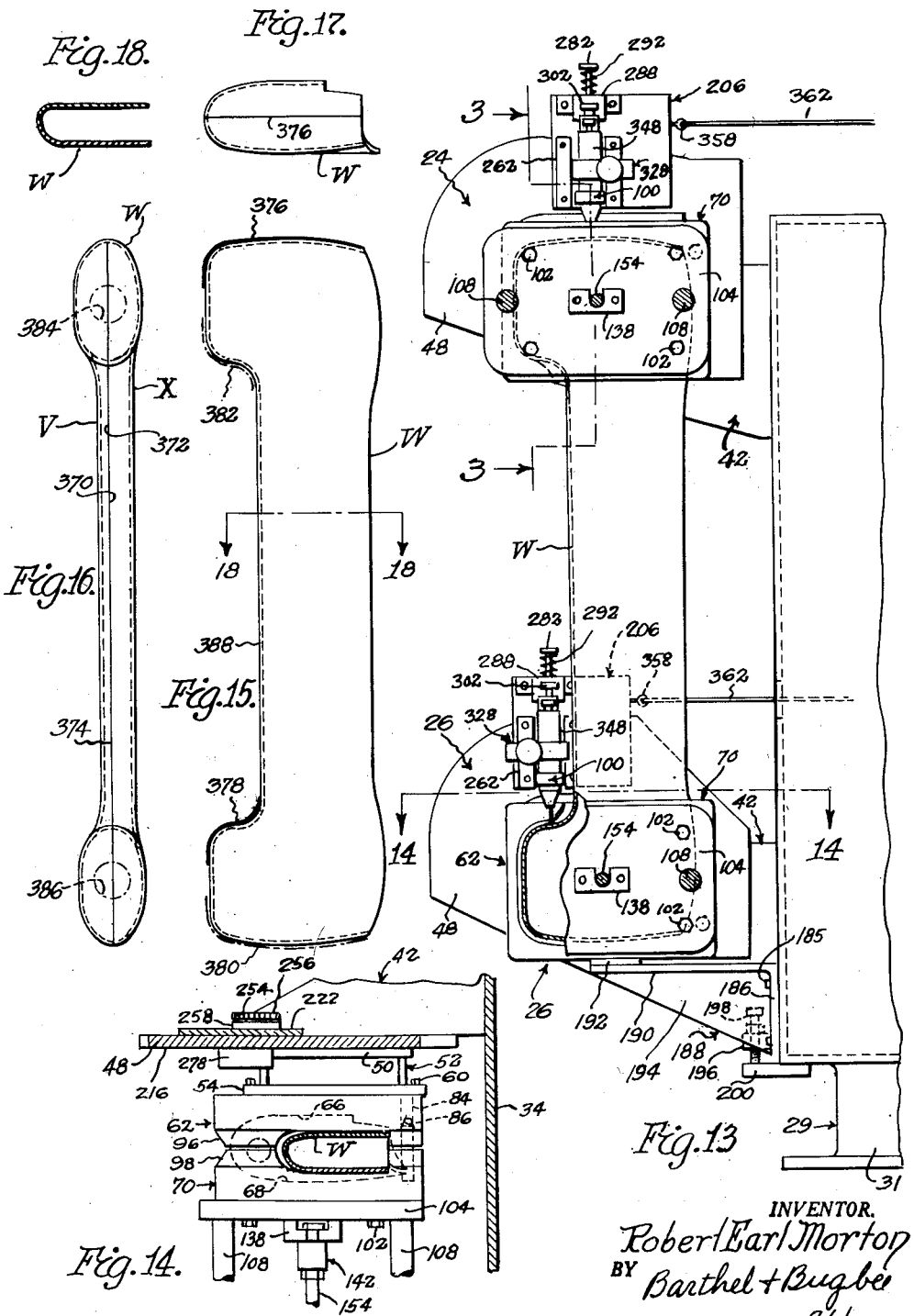
INVENTOR.
Robert Earl Morton
BY Barthel + Bugbee
Attys

United States Patent Office 2,800,570
Patented July 23, 1957

2,800,570

CONTOUR WELDING MACHINE

Robert Earl Morton, Whitehall, Mich.

Application March 31, 1955, Serial No. 498,204

13 Claims. (Cl. 219—124)

This invention relates to welding machines and, in particular, to welding machines with traveling welding tools.

One object of this invention is to provide a contour welding machine for welding together parts having curved or irregular surfaces along their proposed line of weld and employing a welding tool which is automatically moved along the line of weld while the parts to be welded are clamped together.

Another object is to provide a contour welding machine of the foregoing character wherein the welding tip of the welding tool, such as the welding electrode of an electric arc welder, is maintained at a constant distance from the line of weld at all points along the path of travel.

Another object is to provide a contour welding machine of the foregoing character wherein the axis of the welding tip of the welding tool is maintained constantly radial to the curved portions of the workpiece and constantly perpendicular to the straight portions thereof along the line of weld.

Another object is to provide a contour welding machine of the foregoing character having mechanism for driving the welding tool at a predetermined constant speed along the line of weld regardless of the contour or curvature of the workpiece at the line of weld.

Another object is to provide a contour welding machine of the foregoing character wherein means is provided for welding together different portions of the workpiece disposed at spaced locations relatively to one another.

Another object is to provide a contour welding machine of the foregoing character wherein the workpiece parts to be welded together are held firmly in engagement by improved clamping mechanism which is quickly and easily applied and released.

Other objects and advantages of the invention will become apparent during the course of the following description of the accompanying drawings, wherein:

Figure 2 is a top plan view of the welding machine of Figure 1;

Figure 3 is an enlarged fragmentary vertical section through a clamped portion of the workpiece taken along the lines 3—3 in Figure 13;

Figure 6 is an enlarged fragmentary front elevation of the upper left-hand corner of Figure 1, partly in vertical section;

Figure 7 is a horizontal section taken along the line 7—7 in Figure 6;

Figure 8 is a fragmentary right-hand side elevation of the upper portion of Figure 1, looking along the line 8—8 therein, with the clamping jaws and workpiece removed but their positions shown in dotted lines;

Figure 9 is a fragmentary horizontal section taken along the line 9—9 in Figure 8;

Figure 10 is a fragmentary right-hand side elevation of the lower portion of Figure 1, looking along the line 10—10 therein, with the clamping jaws and workpiece removed but their positions shown in dotted lines;

Figure 11 is an enlarged fragmentary view of the central portion of Figure 10, with the welding tool removed to show the construction behind it;

Figure 12 is a fragmentary top plan view of Figure 10 with the welding tool and its carriage removed, and with the clamping jaws and workpiece shown in solid lines;

Figure 13 is a vertical section, mainly in right-hand side elevation, taken along the line 13—13 in Figure 1;

Figure 14 is a horizontal section taken along the line 14—14 in Figure 13, again showing the clamping jaws;

Figure 15 is a side elevation of the completed workpiece welded together by the machine of Figures 1 to 14 inclusive;

Figure 16 is a left-hand side elevation of the workpiece shown in Figure 15;

Figure 17 is a top plan view of the workpiece shown in Figure 15; and

Figure 18 is a horizontal section through the workpiece taken along the line 18—18 in Figure 15.

*General arrangement*

Figure 1:
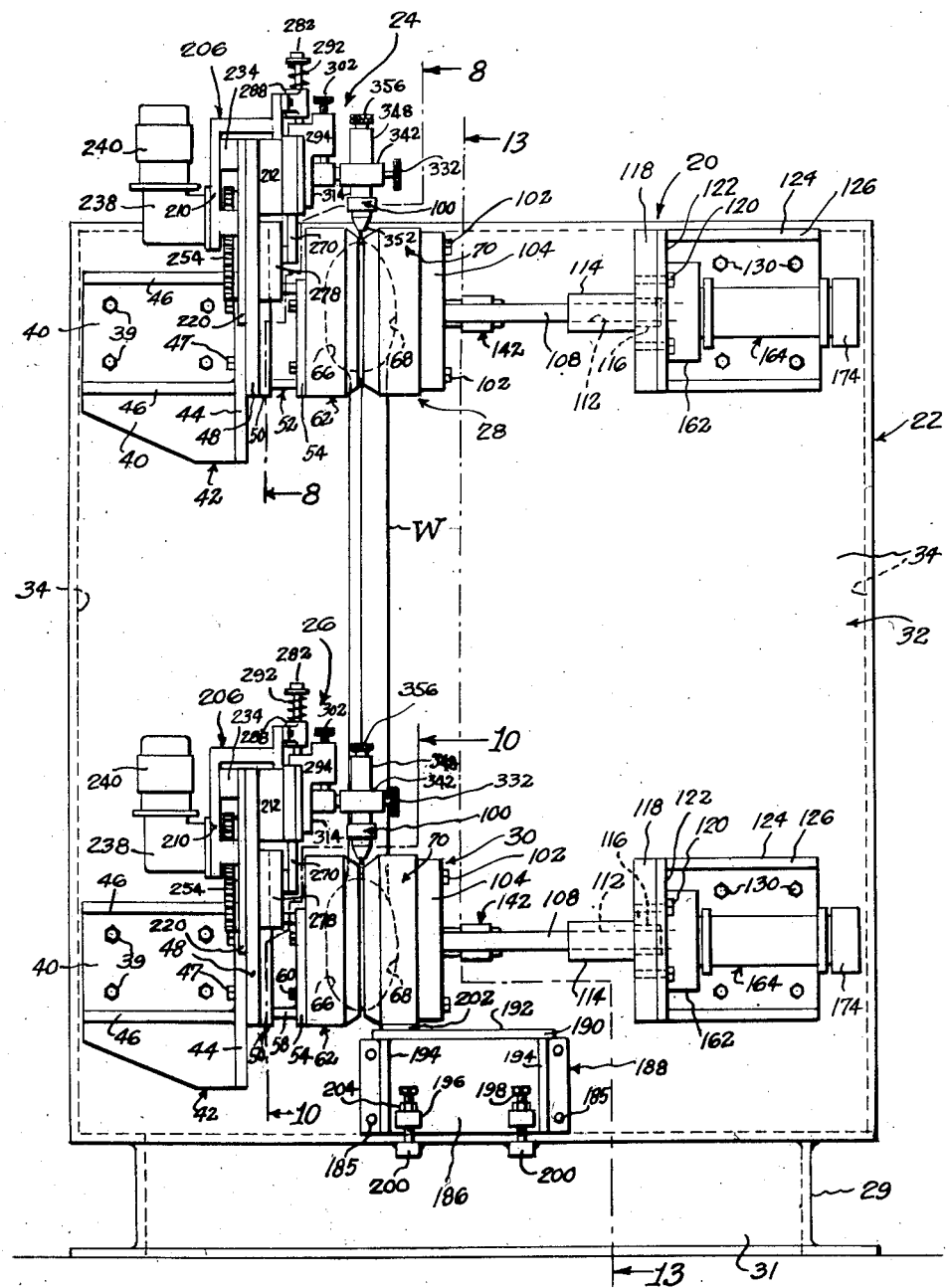
Figure 1 is a front elevation of a contour welding machine, according to one form of the invention.

Referring to the drawings in detail, Figures 1, 2 and 3 show a contour welding machine, generally designated 20, consisting of a supporting structure, generally designated 22, upon which are mounted upper and lower contour welding units, generally designated 24 and 26, respectively, adapted to weld together workpiece halves held by upper and lower workpiece clamping units, generally designated 28 and 30 respectively cooperating therewith. The upper and lower welding units 24 and 26 and their respective clamping units 28 and 30 are of substantially the same construction, differing only in minor details, hence a single description will suffice for both. Accordingly, the corresponding parts thereof are designated, for the most part, with the same reference numerals, thereby avoiding needless duplication of description.

The supporting structure 22 consists of a hollow rectangular base structure 29 built up of angle or channel members 31 welded or otherwise secured to one another in a rectangular arrangement, and serving to support a hollow rectangular upright structure, generally designated 32, upon which the upper and lower contour welding units 24 and 26 and their workpiece clamping units 28 and 30 are mounted, as described below. The upright structure 32 consists of vertical plates 34 welded or otherwise secured to one another in a rectangular box-shaped manner partially closed at the top by a rectangular plate 36 having a rectangular aperture 38 in the center thereof (Figure 2).

Bolted or otherwise secured at 39 to the front plate 34 of the upright box-like structure 32 is the back plate 40 of an angle bracket 42 which supports each of the upper and lower contour welding units 24 and 26. Each bracket 42 has a front plate 44 projecting forward perpendicularly to the back plate 40 and joined thereto by approximately triangular reinforcing webs 46.

Upper and lower clamping unit construction

Figures 4, 5:
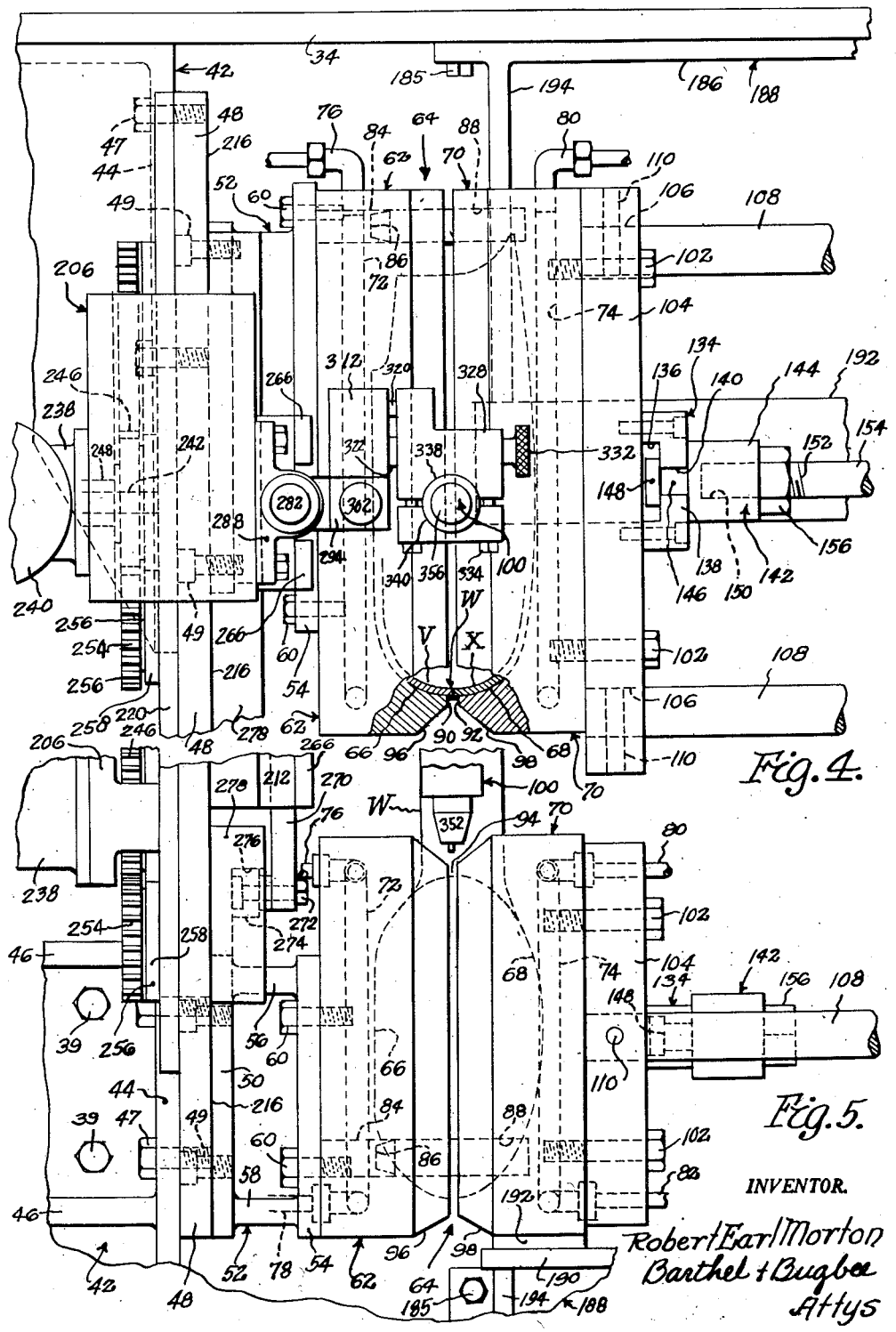
Figure 4 is an enlarged fragmentary top plan view of the portion of the lower welding and clamping units shown in the lower left-hand corner of Figure 2, with a portion of the clamping jaws broken away to show part of the workpiece in cross-section.
Figure 5 is an enlarged fragmentary front elevation of the portion of the lower welding and clamping units shown in the lower left-hand corner of Figure 1.

Bolted or otherwise secured at 47 to the front plate 44 of the angle bracket 42 (Figures 4 and 5) is an intermediate plate 48 which in turn is bolted or otherwise secured at 49 to one side plate 50 of a spacing element 52 having an opposite side plate 54 spaced therefrom and connected thereto by top and bottom members 56 and 58 respectively (Figures 5 and 6.) Bolted or otherwise secured at 60 to the outer side plate 54 of the spacing element 52 (Figure 5) is the stationary hollow clamping jaw 52 of a workpiece clamping device, generally designated 64, forming the jaw set of the upper and lower workpiece clamping units 28 and 30. The stationary clamping jaw 62 is provided with a recess 66 configured to fit one half V of the workpiece W to be welded (Figures 15 to 17 inclusive), the other half X of which fits into a recess 68 in a hollow movable clamping jaw 70 (Figures 4 and 5).

The fixed and movable clamping jaws 62 and 70 are provided with cooling liquid passageways 72 and 74, each being in the approximate form of a letter U laid on its side and having upper and lower pipe connections 76, 78 and 80, 82 for the circulation of cooling water or other cooling liquid to carry away the heat developed during the welding operations. The fixed or stationary clamping jaw 62 is provided with a pilot bore 84 which is slidably engaged by a pilot pin 86 firmly seated in an aligned bore 88 in the movable clamping jaw 70 (Figure 4) so as to insure alignment of the jaws 62 and 70 as the movable jaw 70 moves toward and away from the stationary jaw 62. The adjacent faces 90 and 92 of the clamping jaws 62 and 70 are separated from one another by a gap 94 and are beveled as at 96 and 98 respectively to provide clearance for the path of travel of the welding device, generally designated 100, as described more fully below.

Bolted at 102 to the movable clamping jaw 70 is a mounting plate 104 which in turn is bored as at 106 to receive parallel guide rods 108 which are pinned or otherwise secured therein as at 110 (Figure 5). The opposite ends of the guide rods 108 slidably engage bores 112 in guide bushings 114, the reduced diameter ends of which are seated in bores 116 (Figure 2) in a mounting plate 118. The mounting plate 118 is in turn bolted as at 120 to the forwardly-projecting front plate or arm 122 of an angle bracket 124 similar to the angle bracket 42 and similarly provided with triangular webs 126 joining the front plate 122 to the rear plate 128. The latter is also bolted as at 130 to the vertical front plate 34 of the box-like upright structure 32.

Bolted or otherwise secured as at 132 to the mounting plate 104 (Figures 4 and 5) is a bracket 134 having a recess 136 behind its front wall 138 and having a U-shaped slot 140 extending through its front wall 138 into the recess 136. Detachably secured to the bracket 134 is a piston rod coupling 142 (Figure 4) having a main body portion 144, a neck portion 146 fitting the U-shaped slot 140 and a head 148 received in the recess 136 in the back of the bracket 134, the head 148 and neck 146 being of circular cross-section. The main body portion 144 of the coupling 142 is bored and threaded as at 150 coaxial with the head 148 and neck 146 to adjustably receive the threaded end portion 152 of a piston rod 154 held in its adjusted position by a lock nut 156.

The mounting plate 118 is bored as at 158 for the passage of the piston rod 154 and also for the reception of a coaxially-bored boss or projection 160 (Figure 2) on the forward end of a cylinder head 162 of a reciprocatory hydraulic motor 164. The cylinder head 162 is provided with a fluid port 166 and is also bored as at 168 for the passage of the piston rod 154 and at 170 for the reception of the forward end of the cylinder 172 of the hydraulic motor 164, the rearward end of which carries a cylinder head 174 having a fluid port 176. Mounted upon the rearward end of the piston rod 154 and reciprocable within the cylinder bore 178 thereof is a piston head 180. Fluid under pressure is supplied by pipes 182 and 184 to the fluid ports 166 and 176 respectively from any suitable source of pressure fluid (not shown), such as a conventional hydraulic pump, by way of a conventional four-way control valve (also not shown).

The lower clamping unit 30 is additionally guided in its reciprocation by the following mechanism not found in the upper clamping unit 28, because of possible interference with the loading and unloading of the workpieces W. Bolted or otherwise secured as at 185 to the front vertical plate 34 of the supporting structure 22 is the vertical wall 186 of an angle bracket 188 (Figures 1 and 13), the horizontal wall 190 of which is machined on its upper side to provide a rectilinear guide surface 192, triangular reinforcing webs 194 being provided for imparting additional rigidity. Bosses 196 integral with the rear wall 186 or welded integrally thereto project forwardly therefrom in horizontally-spaced relationship and are drilled and threaded to receive adjusting screws 198, the lower ends of which engage bars 200 welded or otherwise secured to the base structure 29 in horizontally spaced parallel relationship. The bolts 185 pass through sufficiently loose holes in the rear wall 186 of the angle bracket 188 to provide sufficient play for the action of the adjusting screws 198 in order to tilt the guide surface 192 until it is properly positioned for engagement by a wear plate 202 resting thereon and secured to the underside of the movable clamping jaw 70 of the lower clamping unit 30. Lock nuts 204 hold the adjusting screws 198 in their adjusted positions.

Upper and lower welding unit construction

The upper and lower contour welding units 24 and 26, as stated above, are substantially of the same construction, with only minor differences, hence a single description with corresponding reference numerals will suffice for both and avoid duplication of description. The intermediate vertical plate 48 which supports the spacing element 52 of the stationary clamping jaw 62 likewise guides the principal parts of the welding units 24 and 26 in their travel relatively to the workpiece W. Each welding unit 24 or 26 (Figures 6 to 9 inclusive) is mounted upon a carriage, generally designated 206, having a horizontal top wall 208 from which spaced parallel vertical side walls 210 and 212 extend downward. The side wall 212 has a machined inner surface 214 (Figure 6) which slidably engages the correspondingly-machined adjacent surface 216 of the intermediate plate 48. Bolted as at 217 and 218 to the opposite side of the intermediate plate 48 are spaced cam plates 220 and 222 respectively. The cam plates 220 and 222 have cam surfaces 224 and 226 respectively engaged by a cam follower roller 228 mounted upon a stud 230 which serves as an axle and which is supported in the carriage side wall 210. The cam folower roller 228 thus rolls in the passageway 232 between the cam surfaces 224 and 226, these being shaped to follow the contour of the welded portion of the workpiece. The exposed side surface of the upper cam plate 220 is engaged by the adjacent surface of a contact block 234 which is secured by fasteners 236 to the carriage side wall 210.

Bolted or otherwise secured to the carriage side wall 210 is a reduction gear set 238 surmounted and driven by an electric driving motor 240 and having an output shaft 242. Keyed to the output shaft 242 is the hub 244 of a combined gear and wheel, generally designated 246, the hub 244 being rotatably mounted in the bore 248 in the carriage side wall 210 (Figures 6 and 7). The combined gear and wheel 246 has a gear portion 250 and wheel portion 252 located side by side, the teeth of the gear portion 250 meshing with the rack portion 254 of a rack track 256 likewise having a shape corresponding to the shape of the joint of the workpiece to be welded. The rack track 256 has a correspondingly-shaped smooth-surfaced track portion 258 upon which the wheel portion 252 rolls while the gear portion 250 meshes with and drivingly engages the rack portion 254. The rack track 256 is secured by the fasteners 260 to the lower cam plate 222 which, as previously stated, was secured by the fasteners 218 to the intermediate plate 48.

Projecting horizontally outward from the carriage side wall 212 is a rectangular boss 262 having a vertical guide groove or guideway 264 of rectangular cross-section (Figure 7) closed in part at its front edge by parallel vertical guide bars 266 secured to the boss 262 by the fasteners 268. Slidably mounted for vertical travel in the guideway 264 is a slide 270 bored at its lower end to receive an axle stud 272 upon which a roller 274 is rotatably mounted (Figure 6). The roller 274 engages the contact surface or edge 276 of a guide track 278 which is shaped to correspond to the shape of the welded junction of the workpiece W and which is secured by the fasteners 280 to the intermediate plate 48.

The roller 274 and slide 270 are urged upwardly to maintain the roller 274 in contact with the guide surface 276 of the guide track 278 by a headed plunger 282, the lower end of which is threaded into a threaded socket 284 in the upper end of the slide 270. The plunger 282 is reciprocably mounted and guided in a bore 286 (Figure 6) in a bracket 288 which is bolted as at 290 to the carriage 206. A compression spring 292 encircling the plunger 282 urges the plunger 282 and slide 270 upward so as to engage the roller 274 constantly with the guide track 278.

Projecting horizontally from the slide 270 in an integral arm 294 having a vertical bore 296 in which a plunger 298 is reciprocably mounted. The plunger 298 is provided with a threaded vertical bore 300 into which is threaded the lower end of an adjustment hand screw 302 which in turn is rotatably mounted in a bore 304 in the arm 294 communicating with the bore 296. A compression coil spring 308 encircles the screw 302 above the plunger 298 in the upper end of the bore 300. The lower end of the plunger 298 is pinned or otherwise secured in a vertical bore 310 in a slide block 312 which slidably engages a machined vertical guide surface 314 on the front of the slide 270.

The slide block 312 (Figure 7) is provided with parallel bores 316 and 318 in which are secured parallel rods 320 and 322, the ends of which project horizontally outward and slidably engage parallel bores 324 and 326 respectively in a welding tool holder 328 in the form of a block. The welding tool holder 328 is bored as at 330 to receive an adjusting hand screw 332, the threaded shank of which is threaded into a threaded bore 334 in the end of the rod 322 and encircled by a compression coil spring 336 which urges the holder 328 away from the end of the rod 322. The holder or block 328 on one side thereof is provided with an approximately semi-cylindrical recess 338 which faces a semi-cylindrical recess 340 in a clamping block 342 which is bored to receive clamping screws 344 threaded into threaded holes 346 in the side of the holder or block 328 containing the semi-cylindrical recess 338.

The semi-cylindrical recesses 338 and 340 face one another so as to form a substantially semi-cylindrical bore into which is inserted the cylindrical shank 348 of a conventional welding device 100, such as a welding tool or torch. The latter is provided at its lower end with a chuck 352 adapted to receive and hold a conventional welding electrode 354 of the type used for electrical arc-welding and electrically connected to a terminal 356 extending through the shank 348 and insulated therefrom. The terminal 358 is adapted to be connected to a flexible cable (not shown) leading to a suitable conventional source of arc-welding current.

The welding carriage 206 is retracted by an eye-bolt 358 (Figure 8) which is threaded into a hole 260 (Figure 6) in the upper wall 208 of the carriage 206. Pivotally connected to the eye-bolt 358 is a link 362, the rearward end of which is connected to the forward end of a tension spring 364 (Figure 2), the rearward end of which is hooked into a spring anchorage 366 secured to and projecting forwardly from an angle bracket 368 which is bolted, welded or otherwise secured to the upright structure 32 of the supporting structure 22.

As previously stated, the upper and lower welding units 24 and 26 differ from one another only in minor details, and in particular only by the difference in the shapes and lengths of the upper and lower cam plates 220 and 222 and the rack track 278, to correspond to the different lengths and configurations of the portions being welded (Figures 15 to 18 inclusive). These elements will, of course, vary with the variation in shapes of the workpieces, the workpiece W of Figures 15 to 18 inclusive being shown only by way of example. The workpiece W of Figures 15 to 18 inclusive may, for example, represent an automobile bumper or a fender guard or grille guard attached thereto. As shown in Figure 16 and 17, it consists of two stampings V and X having contact edges 370 and 372 respectively pressed in contact with one another and welded to one another along a line of junction or parting line 374. More accurately speaking, the present machine welds the edges 370 and 372 together along only a portion of the parting line 374, as indicated by the heavy solid lines 376 and 378 in Figure 15. The upper welded junction 376 is, of course, welded by the upper welding unit 24 and the lower welded junction 378 by the lower welding unit 26.

The halves V and X are additionally welded together in a separate machine of the same construction as the machine 20 but reversed from right to left as when Figure 1 is viewed in a mirror, the workpiece halves V and X also being inverted to weld the junctions 380 and 382 indicated by the heavy dashed lines in Figure 15. The welded junction 380 is welded by the upper welding unit 24 of the reversed machine and the junction 382 by the lower welding unit 26 of the reversed machine. This reversed machine has not been illustrated in the drawings because it is of identical construction with the machine of Figure 1, and, as stated above, differs only in the reversal of its parts from right to left and also in the reversed configuration of the recesses 66 and 68 in its stationary and movable clamping jaws 62 and 70 respectively.

The electric motors 240 which drive the carriages 206 of the upper and lower welding units 24 and 26 (Figure 1) are preferably synchronous motors so that the speeds of the carriages 206 can be accurately controlled and they can be made to move at a predetermined constant and equal speed. The motors 240 are energized from any suitable source of electric current and provided with the usual control switches. Where the path of travel of one carriage 206 is longer than that of the other carriage 206, limit switches are of course provided so that the carriage with the shorter path of travel will halt and its welding tool 100 cease operation while the other carriage 206 and welding tool 100 is finishing its longer path of travel and longer cycle of operation. This situation, for example, is shown by a comparison of Figures 8 and 10 where the upper welding unit 24 (Figure 8) is required to travel a much longer path than the lower welding unit 26 (Figure 10), so that the latter must be permitted to run a much shorter period of time than the former in oredr that both shall cover their paths of travel of different lengths and the shorter-travelling carriage 206 remain inoperative while the longer-travelling carriage 206 finishes its welding task.

*Operation*

In the operation of the invention, let it be assumed that the recesses 66 and 68 (Figure 4) in the stationary and movable clamping jaws 62 and 70 of the upper and lower workpiece clamping devices or jaw sets 64 have been shaped to fit the shape of the workpiece W, such as, for example, the shape of the workpiece halves V and X of the workpiece W shown in Figures 15 to 18 inclusive. The shapes of these recesses 66 and 68 will, of course, vary with different shapes of workpiece and the workpiece shown in Figures 15 to 18 inclusive is given merely by way of example of a typical workpiece.

To load the contour welding machine 20, the operator supplies pressure fluid, such as hydraulic fluid under pressure, to the pipes 182 at the forward ends of the pressure fluid motors 164 and at the same time connects the pipes 184 thereof to the return side of the hydraulic or other pressure fluid circuit, thereby causing the pistons 180, piston rods 154 and movable clamping jaws 70 to move to the right away from the stationary clamping jaws 62. The operator then places an assembled pair of workpiece halves V and X against the stationary clamping jaws 62 with the ends of the workpiece half V and seated in the recesses 66 of the stationary workpiece jaws 62. The operator then reverses the flow of pressure fluid to the pressure fluid motors 164 to cause the pistons 180, piston rods 154 and movable clamping jaws 70 to move to the left, closing the jaw sets 64 and tightly clamping the workpiece halves V and X together along their junction line 374, with their edges 370 and 372 in firm engagement with one another.

The operator then energizes the welding circuits of the upper and lower welding units 24 and 26 and also energizes the motors 240 thereof, whereupon the upper welding unit motor 240 drives the upper welding unit carriage 206 by rotating its driving gear 250. The latter, by meshing with the stationary rack portion 254, causes the carriage 206 to travel to the left (Figure 8) while the wheel portion 252 rolls along the track 258 (Figure 7) and the roller 228 in the space 232 between the opposite guide edges 224 and 226 of the upper and lower cam plates 220 and 222 maintains the axis of the welding device 100, such as the arc welding tool, consantly normal or perpendicular to the line of weld. At the same time, the spring 292 urges the plunger 282 and slide 270 upward so that the roller 274 constantly engages the guide surface or edge 276 of the guide track 278, thereby maintaining the welding electrode 354 at a constant distance from the line of weld. Figures 8 and 10 show the upper and lower welding units 24 and 26 at approximately the mid-portions of their paths of travel.

When the upper welding unit 24 with the longer path of travel has reached a position whereby the remaining length of its path of travel equals the total length of the path of travel of the lower welding unit 26, it closes a limit switch (no shown) which immediately energizes the motor 240 of the lower welding unit 26, which is at the start of its path of travel. The lower welding unit 26 then starts moving and its welding tool 100 becomes energized so that welding commences at its portion of the workpiece W. In particular, the upper welding unit 24 at this time is welding the heavy line portion 376 at the upper end of the workpiece W (Figure 15), while the lower welding unit 26 is welding the heavy line portion 378 a short distance above the lower end of the workpiece W. When the two carriages 206 of the upper and lower welding units 24 and 26 reach positions where their respective welding electrodes 354 of their welding tools 100 have arrived at the ends of their paths of travel, one or both of the carriages 206 engages a second limit switch or set of limit switches (not shown), halting the motors 240 and reversing them while de-energizing the welding tools 100. The reverse rotation of the gears 250 along the racks 254 of the upper and lower welding units 24 and 26 causes the upper and lower carriages 206 to return to their starting positions, where another limit switch or set of limit switches (not shown) halts their operation by de-energizing their respective motors 240. During all of this travel, the tension springs 364 (Figure 2) through their links 362 and eye-bolts 358 (Figures 8 and 10) exert a rearward and slightly downward pressure upon the rearward ends of the carriages 206, causing the rollers 228 to firmly and constantly engage with the guide edge or surface 226 of the lower cam plate 222.

To weld the remaining portions 380 and 382 of the workpiece halves V and X of the workpiece W along their abutting edges 370 and 372 (Figures 15 and 16), the operator reverses the flow of pressure fluid to the hydraulic or other pressure fluid motors of the upper and lower clamping units 28 and 30, opening these clamping units and permitting removal of the partly welded workpiece W. He then transfers the latter to the second contour welding machine previously mentioned but not shown in the drawings, which, as previously stated, is a substantial duplicate of the welding machine shown in Figures 1 to 13 inclusive, except that the parts are reversed from right to left, as in a mirror view of Figure 1. The operator now inverts the workpiece W so that the portion 380 is uppermost and the portion 376 is lowermost and at the same time turns it around so that the portion 382, now near the bottom of the workpiece, faces forward. With the partly welded workpiece W thus positioned, he places it in the clamping units 28 and 30 of the reversed-position or second welding machine and, in the manner previously described in connection with the operation of the machine 20 shown in Figures 1 to 14 inclusive, proceeds to weld the remaining portions 380 and 382 of the workpiece W, as shown in the thus designated heavy-dashed line portions of Figure 15.

In examining the illustrations of the workpiece W of Figures 15 and 16, it will be observed that the halves V and X thereof are welded together only along a part of their adjoining edges 370 and 372. In particular, it will be observed that the workpiece W at the front portions of its opposite ends is provided with holes 384 and 386, which of course interrupt the edges to be welded, whereas the straight portion 388 located between the curved welded portions 382 and 378 (Figure 15) is welded in a separate machine beyond the scope of the present invention and hence requiring no discussion.

What I claim is:

1. A machine for welding clamped workpiece parts together along an irregular junction, said machine comprising an upstanding supporting structure, a pair of relatively-movable workpiece-part clamping elements mounted on said structure in opposed relationship, means for moving one of said clamping elements into and out of engagement with the workpiece part interposed between it and the other clamping element, a guide member on said structure having a guideway extending co-directionally with said junction, a carriage having a bridge portion extending over the top of said structure and depending portions extending downwardly from said bridge portion on opposite sides of said structure, a guideway follower mounted on one of said depending portions in contacting engagement with said guideway, means for propelling said carriage along said guideway, and a welding implement mounted on said carriage and having a welding portion disposed in close proximity to said junction, said supporting structure having a second guide member thereon with a second guideway of configuration corresponding to the configuration of said junction, said carriage having a slide movable vertically thereon, said slide having a second guideway follower engaging said second guideway, said welding implement being mounted on said slide.

2. A machine for welding clamped workpiece parts together along an irregular junction, said machine comprising an upstanding supporting structure, a pair of relatively-movable workpiece-part clamping elements mounted on said structure in opposed relationship, means for moving one of said clamping elements into and out of engagement with the workpiece part interposed between it and the other clamping element, a guide member on said structure having a guideway extending co-directionally with said junction, a carriage having a bridge portion extending over the top of said structure and depending portions extending downwardly from said bridge portion on opposite sides of said structure, a guideway follower mounted on one of said depending portions in contacting engagement with said guideway, means for propelling said carriage along said guideway, and a welding implement mounted on said carriage and having a welding portion disposed in close proximity to said junction, said supporting structure having a second guide member thereon with a second guideway of configuration corresponding to the configuration of said junction, said carriage having a slide movable vertically thereon, said slide having a second guideway follower engaging said second guideway, said welding implement being mounted on said slide, and said carriage having means thereon urging said second guideway follower into engagement with said second guideway.

3. A machine for welding clamped workpiece parts together along an irregular junction, said machine comprising an upstanding supporting structure, a pair of relatively-movable workpiece-part clamping elements mounted on said structure in opposed relationship, means for moving one of said clamping elements into and out of engagement with the workpiece part interposed between it and the other clamping element, a guide member on said structure having a guideway extending co-directionally with said junction, a carriage having a bridge portion extending over the top of said structure and depending portions extending downwardly from said bridge portion on opposite sides of said structure, a guideway follower mounted on one of said depending portions in contacting engagement with said guideway, means for propelling said carriage along said guideway, and a welding implement mounted on said carriage and having a welding portion disposed in close proximity to said junction, said supporting structure having a second guide member thereon with a second guideway of configuration corresponding to the configuration of said junction, said carriage having a slide movable vertically thereon, said slide having a second guideway follower engaging said second guideway, said welding implement being mounted on said slide, said slide having a welding implement holder adjustably mounted thereon, and mechanism for adjustably moving said holder relatively to said slide.

4. A machine for welding clamped workpiece parts together along an irregular junction, said machine comprising an upstanding supporting structure, a pair of relatively-movable workpiece-part clamping elements mounted on said structure in opposed relationship, means for moving one of said clamping elements into and out of engagement with the workpiece part interposed between it and the other clamping element, a guide member on said structure having a guideway extending co-directionally with said junction, a carriage having a bridge portion extending over the top of said structure and depending portions extending downwardly from said bridge portions on opposite sides of said structure, a guideway follower mounted on one of said depending portions in contacting engagement with said guideway, means for propelling said carriage along said guideway, and a welding implement mounted on said carriage and having a welding portion disposed in close proximity to said junction, said supporting structure having a second guide member thereon with a second guideway of configuration corresponding to the configuration of said junction, said carriage having a slide movable vertically thereon, said slide having a second guideway follower engaging said second guideway, said welding implement being mounted on said slide, said guide members and guideway followers being mounted on opposite sides of said upstanding structure.

5. A machine for welding clamped workpiece parts together along an irregular junction, said machine comprising an upstanding supporting structure, a pair of relatively-movable workpiece-part clamping elements mounted on said structure in opposed relationship, means for moving one of said clamping elements into and out of engagement with the workpiece part interposed between it and the other clamping element, a guide member on said structure having a guideway extending co-directionally with said junction, a carriage having a bridge portion extending over the top of said structure and depending portions extending downwardly from said bridge portion on opposite sides of said structure, a guideway follower mounted on one of said depending portions in contacting engagement with said guideway, means for propelling said carriage along said guideway, and a welding implement mounted on the other depending portion and having a welding portion disposed in close proximity to said junction.

6. A machine for welding clamped workpiece parts together along an irregular junction, said machine comprising an upstanding supporting structure, a pair of relatively-movable workpiece-part clamping elements mounted on said structure in opposed relationship, means for moving one of said clamping elements into and out of engagement with the workpiece part interposed between it and the other clamping element, a guide member on said structure having a guideway extending co-directionally with said junction, a carriage having a bridge portion extending over the top of said structure and depending portions extending downwardly from said bridge portion on opposite sides of said structure, a guideway follower mounted on one of said depending portions in contacting engagement with said guideway, a toothed rack mounted on said upstanding structure configured to correspond to said guideway, means including a gear rotatably mounted on said carriage in mesh with said rack for propelling said carriage along said guideway, and a welding implement mounted on said carriage and having a welding portion disposed in close proximity to said junction.

7. A machine for welding clamped workpiece parts together along an irregular junction, said machine comprising an upstanding supporting structure, a pair of relatively-movable workpiece-part clamping elements mounted on said structure in opposed relationship, means for moving one of said clamping elements into and out of engagement with the workpiece part interposed between it and the other clamping element, a guide member on said structure having a guideway extending co-directionally with said junction, a carriage having a bridge portion extending over the top of said structure and depending portions extending downwardly from said bridge portion on opposite sides of said structure, a guideway follower mounted on one of said depending portions in contacting engagement with said guideway, a toothed rack mounted on said upstanding structure configured to correspond to said guideway, means including a power-driven gear rotatably mounted on said carriage in mesh with said rack for propelling said carriage along said guideway, and a welding implement mounted on said carriage and having a welding portion disposed in close proximity to said junction.

8. A machine for welding clamped workpiece parts together along an irregular junction, said machine comprising an upstanding supporting structure, a pair of relatively-movable workpiece-part clamping elements mounted on said structure in opposed relationship, means for moving one of said clamping elements into and out of engagement with the workpiece part interposed between it and the other clamping element, a guide member on said structure having a guideway extending co-directionally with said junction, a carriage having a bridge portion extending over the top of said structure and depending portions extending downwardly from said bridge portion on opposite sides of said structure, a guideway follower mounted on one of said depending portions in contacting engagement with said guideway, means for propelling said carriage in one direction along said guideway, yielding means attached to said carriage for retracting said carriage along said guideway, and a welding implement mounted on said carriage and having a welding portion disposed in close proximity to said junction.

9. A machine for welding clamped workpiece parts together along an irregular junction, said machine comprising an upstanding supporting structure, a pair of relatively-movable workpiece-part clamping elements mounted on said structure in opposed relationship, means for moving one of said clamping elements into and out of engagement with the workpiece part interposed between it and the other clamping element, a guide member on said structure having a guideway extending co-directionally with said junction, a carriage having a bridge portion extending over the top of said structure and depending portions extending downwardly from said bridge portion on opposite sides of said structure, a guideway follower mounted on one of said depending portions in contacting engagement with said guideway, means for propelling said carriage along said guideway, and a welding implement mounted on said carriage and having a welding portion disposed in close proximity to said junction, said supporting structure having a second guide member thereon with a second guideway of configuration corresponding to the configuration of said junction, said carriage having a slide movable vertically thereon, said slide having a second guideway follower engaging said second guideway, said welding implement being mounted on said slide in alignment with the point of contact of said second guideway follower with said second guideway, the first guideway being spaced away from said second guideway follower in a direction along the path of travel of said carriage relatively to said guideways.

10. A machine for welding clamped workpiece parts together along an irregular junction, said machine comprising an upstanding supporting structure, a pair of relatively-movable workpiece-part clamping elements mounted on said structure in opposed relationship, means for moving one of said clamping elements into and out of engagement with the workpiece part interposed between it and the other clamping element, a guide member on said structure having a guideway extending co-directionally with said junction, a carriage having a bridge portion extending over the top of said structure and depending portions extending downwardly from said bridge portion on opposite sides of said structure, a guideway follower mounted on one of said depending portions in contacting engagement with said guideway, means for propelling said carriage along said guideway, and a welding implement mounted on said carriage and having a welding portion disposed in close proximity to said junction, said supporting structure having a second guide member thereon with a second guideway of configuration corresponding to the configuration of said junction, said carriage having a slide movable vertically thereon, said slide having a second guideway follower engaging said second guideway, said welding implement being mounted on said slide in alignment with the point of contact of said second guideway follower with said second guideway, the first guideway being spaced away from said second guideway follower in a direction along the path of travel of said carriage relatively to said guideways, a third guideway on said carriage spaced apart from the first and second guideways, said third guideway having rack teeth associated therewith, said propelling means including a gear rotatably mounted on said carriage in mesh with said rack teeth, and a third guideway follower engaging said third guideway.

11. A machine for welding clamped workpiece parts together along an irregular junction, said machine comprising an upstanding supporting structure, a pair of relatively-movable workpiece-part clamping elements mounted on said structure in opposed relationship, means for moving one of said clamping elements into and out of engagement with the workpiece part interposed between it and the other clamping element, a guide member on said structure having a guideway extending co-directionally with said junction, a carriage having a bridge portion extending over the top of said structure and depending portions extending downwardly from said bridge portion on opposite sides of said structure, a guideway follower mounted on one of said depending portions in contacting engagement with said guideway, means for propelling said carriage along said guideway, and a welding implement mounted on said carriage and having a welding portion disposed in close proximity to said junction, said supporting structure having a second guide member thereon with a second guideway of configuration corresponding to the configuration of said junction, said carriage having a slide movable vertically thereon, said slide having a second guideway follower engaging said second guideway, said welding implement being mounted on said slide in alignment with the point of contact of said second guideway follower with said second guideway, the first guideway being spaced away from said second guideway follower in a direction along the path of travel of said carriage relatively to said guideways, a third guideway on said carriage spaced apart from the first and second guideways, said third guideway having rack teeth associated therewith, said propelling means including a gear rotatably mounted on said carriage in mesh with said rack teeth, and a third guideway follower comprising a roller engaging said third guideway.

12. A machine for welding clamped workpiece parts together along an irregular junction, said machine comprising an upstanding supporting structure, a pair of relatively-movable workpiece-part clamping elements mounted on said structure in opposed relationship, means for moving one of said clamping elements into and out of engagement with the workpiece part interposed between it and the other clamping element, a guide member on said structure having a guideway extending co-directionally with said junction, a carriage having a bridge portion extending over the top of said structure and depending portions extending downwardly from said bridge portion on opposite sides of said structure, a guideway follower mounted on one of said depending portions in contacting engagement with said guideway, means for propelling said carriage along said guideway, and a welding implement mounted on said carriage and having a welding portion disposed in close proximity to said junction, said supporting structure having a second guide member thereon with a second guideway of configuration corresponding to the configuration of said junction, said carriage having a slide movable vertically thereon, said slide having a second guideway follower engaging said second guideway, said welding implement being mounted on said slide in alignment with the point of contact of said second guideway follower with said second guideway, the first guideway being spaced away from said second guideway follower in a direction along the path of travel of said carriage relatively to said guideways, a third guideway on said carriage spaced apart from the first and second guideways, said third guideway having rack teeth associated therewith, said propelling means including a gear rotatably mounted on said carriage in mesh with said rack teeth, and a third guideway follower comprising a roller disposed coaxial with said gear and engaging said third guideway.

13. A machine for welding clamped workpiece parts together along a curved junction, said machine comprising a supporting structure, a pair of relatively-movable workpiece-part clamping elements mounted on said structure in opposed relationship, means for moving one of said clamping elements into and out of engagement with the workpiece part interposed between it and the other clamping element, a guide member on said structure having a guideway curved in correspondence with the curvature of said junction and extending co-directionally with said junction, a carriage movably mounted on said structure for travel both longitudinally therealong and transversely thereto, a welding implement mounted on said carriage and having a welding portion disposed in close proximity to the portion of said junction included between the portions of the workpiece parts clamped between said clamping elements, means for guiding said carriage both longitudinally and transversely in a path disposing said welding portion constantly spaced away from said junction portion and constantly perpendicular thereto, and means for propelling said carriage along said path.

References Cited in the file of this patent

UNITED STATES PATENTS

| | | |
|---|---|---|
| 1,860,172 | Chapman | May 24, 1932 |
| 1,975,578 | Kenney et al. | Oct. 2, 1934 |
| 2,091,308 | Catlett | Aug. 31, 1937 |
| 2,680,182 | Chambers | June 1, 1954 |